United States Patent
Fukushima

(10) Patent No.: US 8,260,125 B2
(45) Date of Patent: Sep. 4, 2012

(54) RECORDING APPARATUS

(75) Inventor: Nobuo Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/835,201

(22) Filed: Jul. 13, 2010

(65) Prior Publication Data

US 2011/0013878 A1   Jan. 20, 2011

(30) Foreign Application Priority Data

Jul. 15, 2009 (JP) ................................. 2009-167188

(51) Int. Cl.
H04N 5/84 (2006.01)
H04N 5/89 (2006.01)
(52) U.S. Cl. ...................................... 386/332; 386/334
(58) Field of Classification Search ........... 386/332–336
See application file for complete search history.

(56) References Cited

U.S. PATENT DOCUMENTS

| 5,099,262 A | 3/1992 | Tanaka |
| 2004/0136685 A1 | 7/2004 | Ota |

FOREIGN PATENT DOCUMENTS

| JP | 02-154367 A | 6/1990 |
| JP | 2000-069428 A | 3/2000 |
| JP | 2004-180191 A | 6/2004 |

*Primary Examiner* — Thai Tran
*Assistant Examiner* — Nigar Chowdhury
(74) *Attorney, Agent, or Firm* — Canon U.S.A., Inc. IP Division

(57) ABSTRACT

A method for an apparatus including an acquisition unit for acquiring moving image data, and a recording unit for recording the acquired moving image data in a loaded recording medium, includes determining whether the recording medium is a recordable and non-erasable recording medium, and if the recording medium is a recordable and non-erasable recording medium, controlling the recording unit so as to automatically stop recording of the moving image data according to the fact that a predetermined time has elapsed from the recording start of the moving image data, and if the recording medium is not a recordable and non-erasable recording medium, controlling the recording unit so as not to automatically stop recording of the moving image data, even if the predetermined time has elapsed from the recording start of the moving image data.

12 Claims, 4 Drawing Sheets

RECORDING APPARATUS

BACKGROUND OF THE INVENTION

1. Field of the Invention

The present invention relates to a recording apparatus.

2. Description of the Related Art

In a recording apparatus for recording moving images or multi-media data such as audios, Japanese Patent Application Laid-Open No. 02-154367 discusses a technology for extending a recording time by a predetermined time unit by a predetermined operation. Further, Japanese Patent Application Laid-Open No. 2000-069428 discusses a technology for continuing capturing a moving image when a recording button is operated after a predetermined time has elapsed, until termination of the operation of the recording button. Japanese Patent Application Laid-Open No. 2004-180191 discusses a technology in which a recording apparatus has a memory for temporarily storing video signals for a predetermined length of time, and recording past video signals according to an extension instruction.

As a recording medium, a recordable and non-erasable optical disk and a semiconductor memory (hereinafter, called write-once recording medium, e.g., Digital versatile disk recordable (DVD-R)), a rewritable optical disk (DVD rewritable (DVD-RW), DVD+RW, DVD random access memory (DVD-RAM), etc.), a hard disk, and, a semiconductor memory have become available. In an imaging apparatus that uses a write-once recording medium as the recording medium, erroneously captured images or audios cannot be erased, and thus a recording area of the recording medium will be consumed wastefully.

For a normal video camera, a toggle button is adopted for start/stop of recording in a recording mode. More specifically, when the recording start/stop button is pressed and released, then recording is started. At this state, when the recording start/stop button is again pressed and released, then the recording is temporarily stopped. Whether the recording is underway or is temporary stopped can be checked on a monitor screen such as an electronic viewfinder (EVF).

However, after start of the recording, sometimes a user may forget to perform a recording stop operation (temporary stop operation or power-off operation). When a video camera is fixed on a tripod, for example, the photographer who does not hold it in hand may often not be watching the monitor screen. As a result, the photographer may not be aware that it is during recording operation. If remaining capacity of the recording medium is small, such a useless recording cannot be allowed.

Such a situation also similarly occurs when music is recorded using a write-once recording medium as the recording medium. Also, even when an erasable recording medium is used, operability will be similarly impaired in the recording apparatus in which an erasure operation is cumbersome.

SUMMARY OF THE INVENTION

According to an aspect of the present invention, an apparatus includes an acquisition unit configured to acquire moving image data, a recording unit configured to record the acquired moving image data in the recording medium loaded in the apparatus, a determination unit configured to determine whether the recording medium loaded in the recording apparatus is a recordable and non-erasable recording medium, a control unit configured to, if the recording medium is a recordable and non-erasable recording medium, control the recording unit so as to automatically stop recording of the moving image data, according to the fact that a predetermined time has elapsed from the recording start of the moving image data, and if the recording medium is not a recordable and non-erasable recording medium, control the recording unit so as not to automatically stop recording of the moving image data, even if a predetermined time has elapsed from the recording start of the moving image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
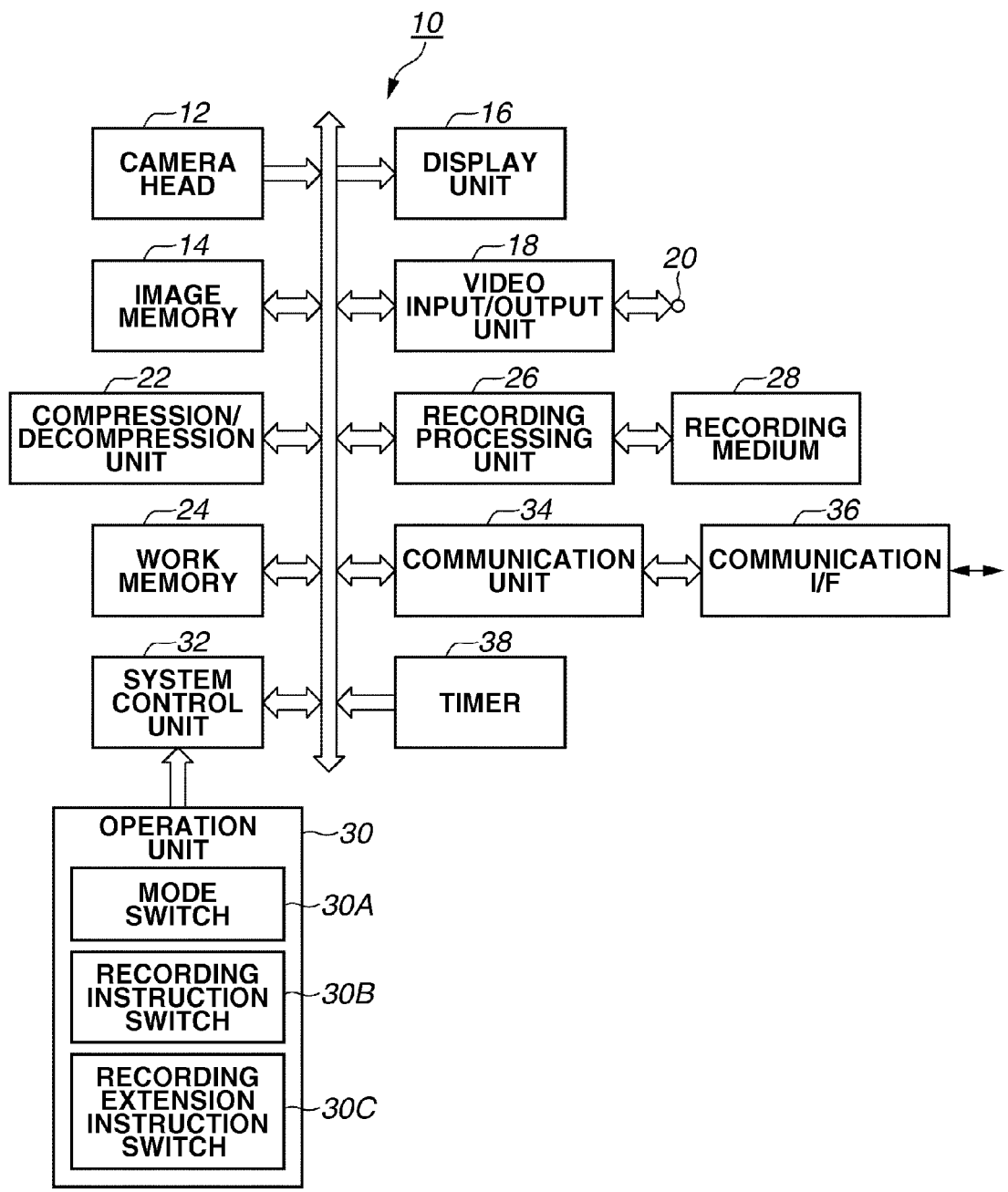
FIG. 1 is a schematic configuration block diagram according to an exemplary embodiment of the present invention.

FIG. 1 is a schematic configuration block diagram of a digital video camera as one exemplary embodiment of the recording apparatus according to the present invention. A camera head 12 of a video camera 10 includes a photographic lens, an image sensor, and an image processing circuit, and outputs at a given period an image signal obtained by capturing image of an object. The camera head 12 may be an input unit for inputting images.

Input data by the camera head 12, that is, an image signal obtained by capturing an image is stored in an image memory 14 by frame unit. A display unit 16 image-displays the image signal stored in the image memory 14. The photographer can determine a composition of the object and a recording chance by observing the displayed image.

A video input/output unit 18 generates a video signal in a predetermined format, for example, National Television System Committee (NTSC) format or phase alternate line (PAL) system from the image signal stored in the image memory 14, and outputs it from a video input/output terminal 20 to the outside.

A compression/decompression unit 22 performs, in the recording mode, compression and coding on image signals from the camera head 12 in sequence, using a moving image compression format such as moving picture experts group phase 2 (MPEG-2), and stores compressed image data in a work memory 24. A recording processing unit 26 adds management data for reproduction to compressed image data in the work memory 24, transforms the data into a data format for recording, and records them in a recording medium 28.

The recording medium 28 is a write-once recording medium or a rewritable recording medium, in the present exemplary embodiment, and a user can load either of these media. The write-once recording medium refers to a recordable and non-erasable optical disk or a semiconductor memory.

The recording processing unit 26 can read out, in the reproduction mode, arbitrary moving image data (in practice, compressed image data) recorded in the recording medium 28, and the read out compressed image data is stored in the work memory 24. The compression/decompression unit 22 decompresses, in the reproduction mode, compressed image data stored in the work memory 24, and stores the obtained reproduced image signals in the image memory 14.

The image signals stored in the image memory 14 are displayed by the display unit 16 as reproduced images. The video input/output unit 18 generates video signals (that is, reproduced video signals) in the predetermined format from the image signals stored in the image memory 14, and outputs them from a video input/output terminal 20 to the outside.

The camera head 12, or, the camera head 12 and the compression/decompression unit 22 are equivalent to an input unit of images or audios.

An operation unit 30 is equipped with a mode switch 30A for designating operation modes, and a recording instruction switch 30B for instructing start/stop of the recording operation by a toggle action, and a recording extension instruction switch 30C for instructing an extension of a recording time. The operation unit 30 is also equipped with a selection key and a determination key for designating or selecting an item from among various menu items displayed on a screen of the display unit 16.

In the recording instruction switch 30B of the toggle action, a switch operation when the recording is not being performed corresponds to an operation of recording start instruction, and a switch operation when recording is being performed corresponds to a recording stop instruction. It is obvious that a switch for the recording start instruction and a switch for the recording stop instruction can be separately provided.

A system control unit 32 controls respective units described above according to an operation of the operation unit 30. The system control unit 32 includes, for example, a microcomputer, or central processing unit (CPU) and memory. The system control unit 32 can communicates with external devices via the communication unit 34, and a communication interface (I/F) 36 such as IEEE 1394 or universal serial bus (USB), and can transmit and receive data.

A timer 38 measures current date and time, and outputs year/month/date/hour/minute/second data. The timer 38 outputs a time less than one second in, for example, one-hundredths of a second unit. The system control unit 32 can detect arbitrary lapse of time by referring to an output of the timer 38.

Figure 2:
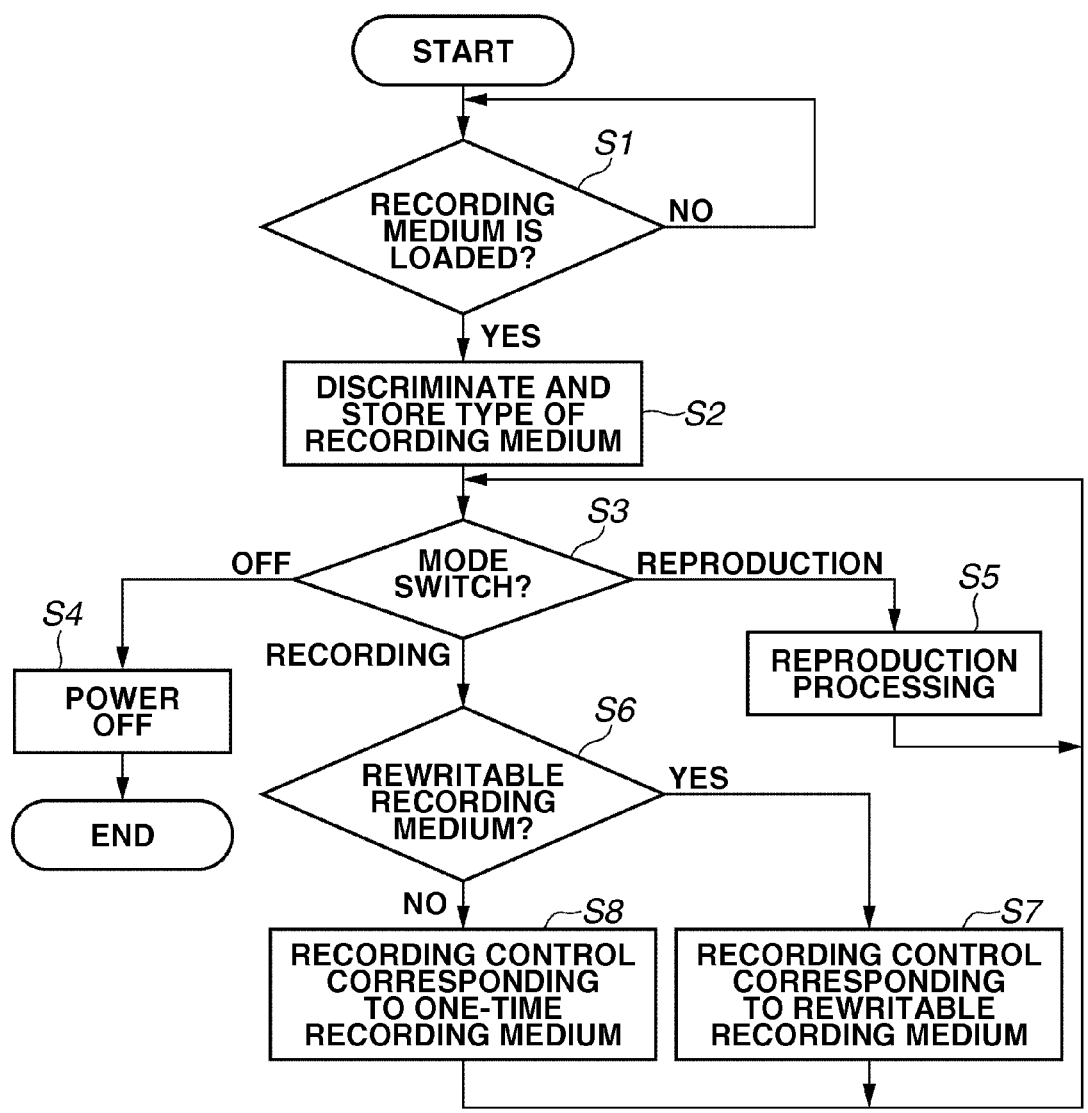
FIG. 2 is an operation flowchart according to the exemplary embodiment.
Figure 3:
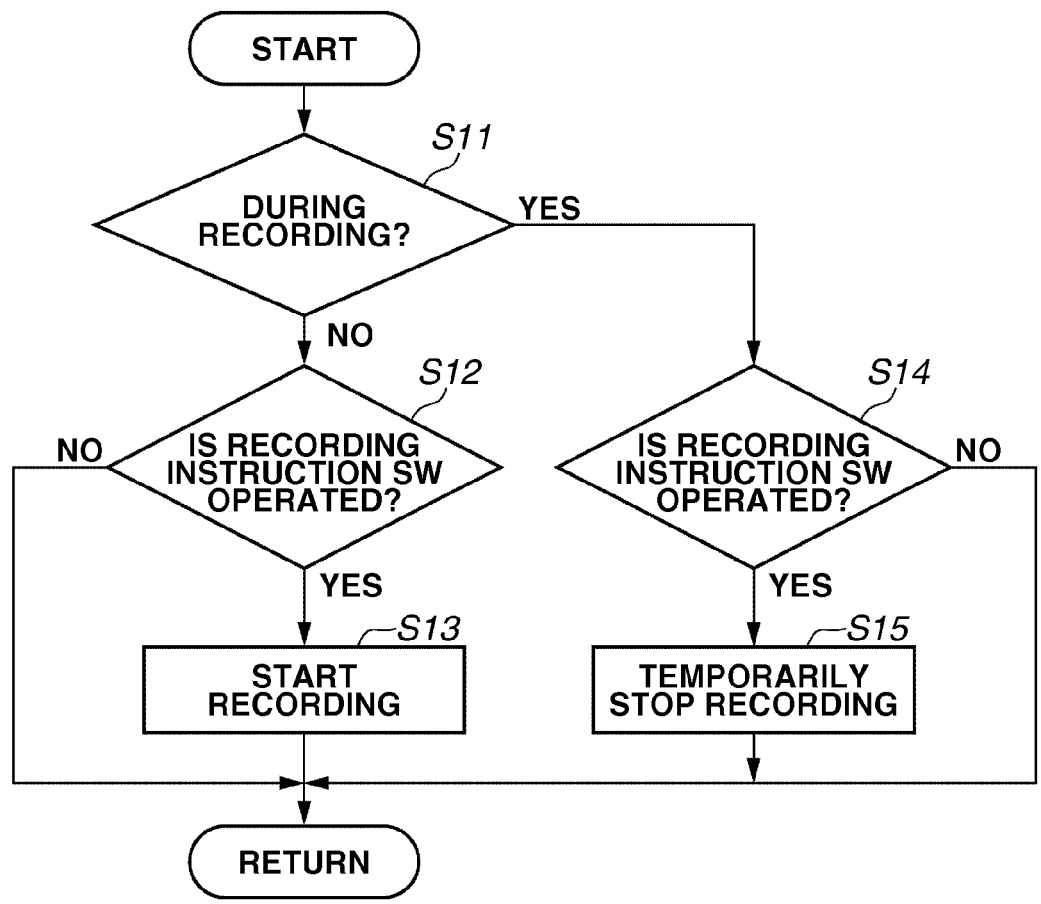
FIG. 3 is a detailed flowchart of a recording control with respect to a rewritable recording medium illustrated in FIG. 2.
Figure 4:
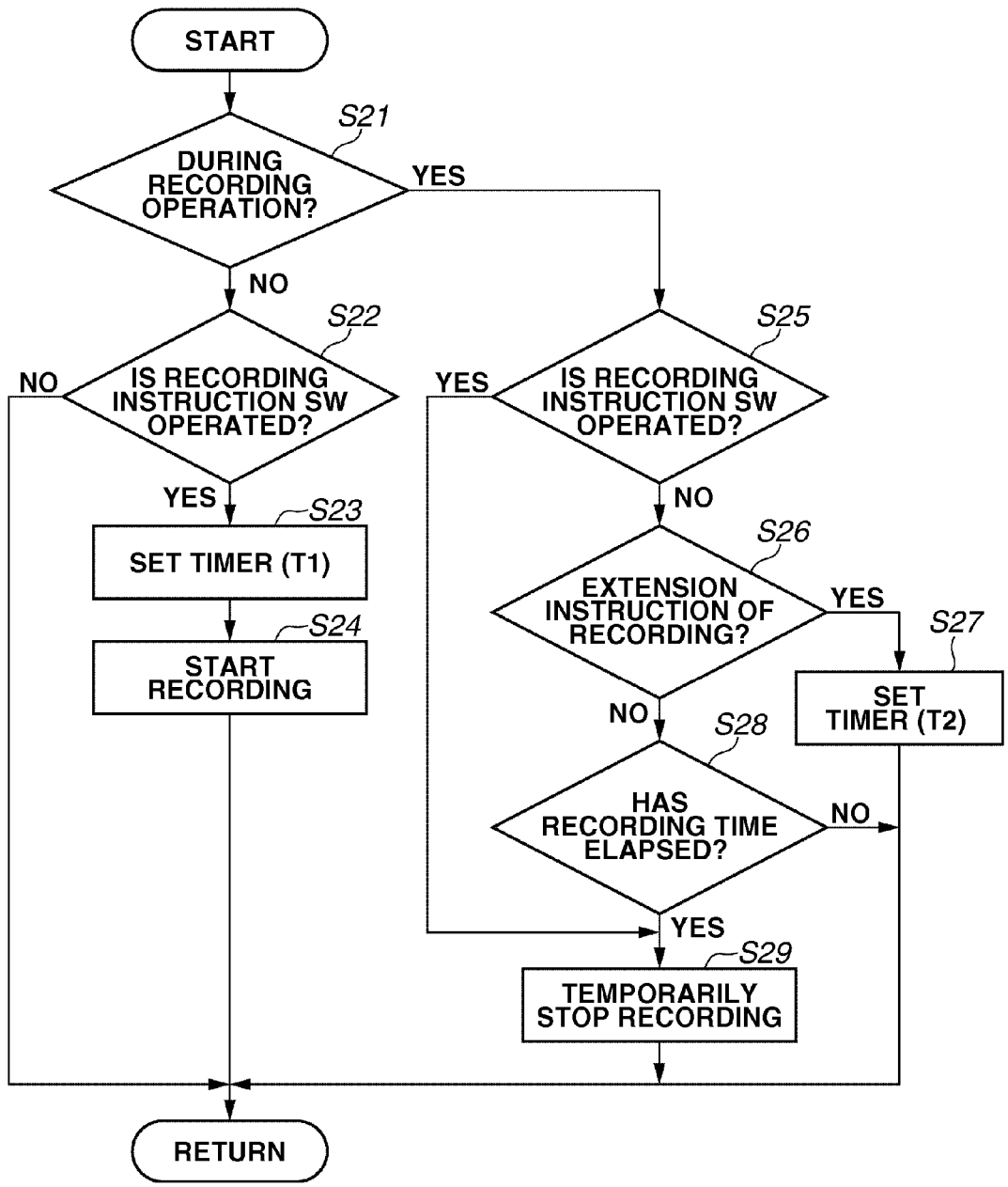
FIG. 4 is a detailed flowchart of a recording control with respect to a write-once recording medium illustrated in FIG. 2.

FIGS. 2, 3, and 4 are flow charts illustrating operation of the present exemplary embodiment. An operation of the present exemplary embodiment will be described below with reference to FIGS. 2 through 4.

In step S1, the system control unit 32 checks first if the recording medium 28 is loaded. Then, in step S2, the system control unit 32 discriminates a type of the loaded recording medium 28 (write-once recording medium or rewritable recording medium), and stores it in the work memory 24.

In step S3, the system control unit 32 checks if the mode switch 30A of the operation unit 30 is in the off position, in the recording mode position, or in the reproduction mode position. If the mode switch 30A is in the off position (OFF in step S3), the processing proceeds to step S4. In step S4, the power of the video camera 10 is turned off. If the mode switch 30A is in the reproduction mode position (REPRODUCTION in step S3), the processing proceeds to step S5. In step S5, respective units are operated in the reproduction mode. Since the operation in the reproduction mode is irrelevant to the present invention, detailed descriptions will be omitted.

In step S3, if the mode switch 30A is in the recording mode position (RECORDING in step S6), the processing proceeds to step S6. In step S6, the system control unit 32 refers to medium type information stored in the work memory 24. If the recording medium 28 is a rewritable recording medium (YES in step S6), then in step S7, the system control unit 32 executes recording control corresponding to the rewritable recording medium. On the other hand, if the recording medium 28 is a write-once recording medium (NO in step S6), then in step S8, the system control unit 32 executes recording control corresponding to the write-once recording medium.

FIG. 3 illustrates detailed flowchart of the recording control corresponding to the rewritable recording medium performed in step S7. If it is not during recording operation (NO in step S11), the processing proceeds to step S12. In step S12, in response to an operation of the recording instruction switch 30B (YES in step S12), then in step S13, the system control unit 32 controls the camera head 12, the compression/decompression unit 22, and the recording processing unit 26 so as to start the above-described recording operation.

On the other hand, if it is during recording operation (YES in step S11), the processing proceeds to step S14. In step S14, in response to an operation of the recording instruction switch 30B (YES in step S14), then in step S15, the system control unit 32 controls the camera head 12, the compression/decompression unit 22, and the recording processing unit 26 so as to temporarily stop the recording operation.

FIG. 4 illustrates detailed flowchart of the recording control corresponding to the write-once recording medium performed in step S8. If it is not during recording operation (NO in step S21), the processing proceeds to step S22. In step S22, in response to the operation of the recording instruction switch 30B (YES in step S22), then in step S23, the system control unit 32 sets a predetermined initial recording time T1 for a built-in timer. Then, in step S24, the system control unit 32 controls the camera head 12, the compression/decompression unit 22 and the recording processing unit 26 so as to start the above-described recording operation.

The system control unit 32 decrements the built-in timer according to an output of the timer 38. When a value of the built-in timer becomes 0, it means the preset recording time has elapsed. During the recording operation, remaining recording time is displayed on a screen of the display unit 16.

If it is during recording operation (YES in step S21), and if the recording instruction switch 30B is not operated (NO in step S25), then in step S26, the system control unit 32 checks if an extension instruction of recording by the recording extension instruction switch 30C is given. If the instruction of the recording extension is given (YES in step S26), then in step S27, the system control unit 32 adds an extended recording time T2 to the built-in timer (remaining recording time). Accordingly, the recording time is extended. At this time, since it is obvious that the system control unit 32 continues the recording, the processing returns to step S3 in FIG. 2.

The initial recording time (T1) and/or the extended recording time (T2) can be arbitrarily set, and the user has set these desired values before setting the recording mode.

If an instruction of the recording extension is not given (NO in step S26), then in step S28, the system control unit 32 checks if the recording time has elapsed by referring to the built-in timer. If the recording time has elapsed (YES in step S28), then in step S29, the system control unit 32 controls the camera head 12, the compression/decompression unit 22, and the recording processing unit 26 so as to temporarily stop the recording operation. If the recording time has not yet elapsed (NO in step S28), the system control unit 32 returns to step S3 in FIG. 2.

If it is during recording operation (YES in step S21), and if the recording instruction switch 30B is operated (YES in step S25), then in step S29, the system control unit 32 controls the camera head 12, the compression/decompression unit 22, and the recording processing unit 26 so as to temporarily stop the recording operation, immediately.

In the present exemplary embodiment, when the rewritable recording medium is thus used, start/stop of recording is controlled with the recording instruction switch 30B. On the other hand, in a case where the write-once recording medium is used, the recording can be temporarily stopped according to the lapse of the preset recording time even if the instruction of recording stop with the recording instruction switch 30B is not given. Then, if it is during recording operation, the recording time can be extended. Accordingly, in the write-once recording medium, recording is accomplished within a time range that the user desires while preventing needless recording.

It is possible to cause so-called auto power-off function of automatically stopping power source when a video camera is left with the power source on to work together with the recording control based on the recording time.

Although the exemplary embodiment, which is applied to a video camera for recording moving images, has been described, it is obvious that the present invention can be also applied to an audio recording apparatus for recording audios.

Accordingly, the program code itself, which is installed to the computer for implementing the functional processing of the present invention with the computer, implements the present invention. That is, the present invention also includes the computer program implementing the functional processing of the present invention.

Accordingly, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium, such as a CD-ROM and the like, which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-167188 filed Jul. 15, 2009, which is hereby incorporated by reference herein in its entirety.

What is claimed is:

1. An apparatus comprising:
an acquisition unit configured to acquire moving image data;
a recording unit configured to record the acquired moving image data in an apparatus;
a determination unit configured to determine whether the recording medium is a recordable and non-erasable recording medium;
a control unit configured to, if the recording medium is a recordable and non-erasable recording medium, control the recording unit so as to automatically stop recording of the moving image data, according to a fact that a predetermined time has elapsed from the recording start of the moving image data, and if the recording medium is not a recordable and non-erasable recording medium, control the recording unit so as not to automatically stop recording of the moving image data, even if a predetermined time has elapsed from the recording start of the moving image data.

2. The apparatus according to claim 1, further comprising:
an instruction unit configured to instruct an extension of recording time,
wherein if the recording medium is a recordable and non-erasable recording medium, the control unit continues recording even if a predetermined time has elapsed from the recording start instruction, according to the fact that an extension instruction of the recording time has been given by the instruction unit, before a predetermined time has elapsed from the recording start instruction.

3. An apparatus comprising:
an acquisition unit configured to acquire audio data;
a recording unit configured to record the acquired audio data in the recording medium;
a determination unit configured to determine whether the recording medium is a recordable and non-erasable recording medium; and
a control unit configured to, if the recording medium is a recordable and non-erasable recording medium, control the recording unit so as to automatically stop recording of the audio data, according to a fact that a predetermined time has elapsed from recording start of the audio data, and if the recording medium is not a recordable and non-erasable recording medium, control the recording unit so as not to automatically stop recording of the audio data even if a predetermined time has elapsed from the recording start of the audio data.

4. The apparatus according to claim 3, further comprising:
an instruction unit configured to instruct an extension of the recording time,
wherein if the recording medium is a recordable and non-erasable recording medium, the control unit continues recording even if a predetermined time has elapsed from the recording start instruction, according to the fact that an extension instruction of the recording time has been given by the recording extension instruction unit, before the predetermined time has elapsed from recording start instruction.

5. A method for an apparatus including an acquisition unit configured to acquire moving image data, and a recording unit configured to record the acquired moving image data in a loaded recording medium, the method comprising:
determining whether the recording medium is a recordable and non-erasable recording medium; and
controlling, if it the recording medium is a recordable and non-erasable recording medium, the recording unit so as to automatically stop recording of the moving image data according to a fact that a predetermined time has elapsed from recording start of the moving image data, and
controlling, if the recording medium is not a recordable and non-erasable recording medium, the recording unit so as not to automatically stop recording of the moving image data, even if the predetermined time has elapsed from recording start of the moving image data.

6. The method according to claim 5, further comprising:
controlling, if the recording medium is a recordable and non-erasable recording medium, to continue recording even if the predetermined time has elapsed from the recording start instruction, according to the fact that an extension of the recording time has been instructed, before the predetermined time has elapsed from the recording start instruction.

7. A method for an apparatus including an acquisition unit configured to acquire audio data, and a recording unit configured to record the acquired audio data in a loaded recording medium, the method comprising:
determining whether the recording medium loaded in the recording apparatus is a recordable and non-erasable recording medium;
controlling, if the recording medium is a recordable and non-erasable recording medium, the recording unit so as to automatically stop recording of the audio data, according to the fact that a predetermined time has elapsed from the recording start of the audio data, and
controlling, if it the recording medium is not a recordable and non-erasable recording medium, the recording unit so as not to automatically stop recording of the audio data even if the predetermined time has elapsed from recording start of the audio data.

8. The method according to claim 7, further comprising:
controlling, if the recording medium is a recordable and non-erasable recording medium, to continue recording, even if the predetermined time has elapsed from the recording start instruction, according to the fact that an extension of the recording time has been instructed, before the predetermined time has elapsed from the recording start instruction.

9. A nonvolatile recording medium storing a control program for an apparatus including an acquisition unit configured to acquire moving image data, and a recording unit configured to record the acquired moving image data in a loaded recording medium, the control program causes the recording apparatus to execute a method, the method comprising:
determining whether the recording medium loaded in the recording apparatus is a recordable and non-erasable recording medium;
controlling, if the recording medium is a recordable and non-erasable recording medium, the recording unit so as to automatically stop recording of the moving image data, according to the fact that a predetermined time has elapsed from recording start of the moving image data, and
controlling, if the recording medium is not a recordable and non-erasable recording medium, the recording unit so as not to automatically stop recording of the moving image data, even if the predetermined time has elapsed from recording start of the moving image data.

10. The nonvolatile recording medium according to claim 9, further comprising:
controlling, if the recording medium is a recordable and non-erasable recording medium, to continue recording even if the predetermined time has elapsed from the recording start instruction, according to the fact that an extension of the recording time has been instructed, before the predetermined time has elapsed from the recording start instruction.

11. A nonvolatile recording medium storing a control program for an apparatus including an acquisition unit configured to acquire audio data, and a recording unit configured to record the acquired audio data in a loaded recording medium, the control program causes the apparatus to execute a method, the method comprising:
determining whether the recording medium loaded in the recording apparatus is a recordable and non-erasable recording medium;
controlling, if the recording medium is a recordable and non-erasable recording medium, the recording unit so as to automatically stop recording of the audio data, according to the fact that a predetermined time has elapsed from recording start of the audio data, and
controlling, if the recording medium is not a recordable and non-erasable recording medium, the recording unit so as not to automatically stop recording of the audio data, even if the predetermined time has elapsed from the recording start of the audio data.

12. The nonvolatile recording medium according to claim 11, further comprising:
controlling, if the recording medium is a recordable and non-erasable recording medium, to continue recording, even if the predetermined time has elapsed from the recording start instruction, according to the fact that an extension of the recording time has been instructed, before the predetermined time has elapsed from the recording start instruction.

* * * * *